United States Patent
Urata

(10) Patent No.: US 10,866,759 B2
(45) Date of Patent: Dec. 15, 2020

(54) DEDUPLICATION STORAGE SYSTEM HAVING GARBAGE COLLECTION CONTROL METHOD

(71) Applicant: FUJITSU LIMITED, Kawasaki (JP)

(72) Inventor: Kazuhiro Urata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 16/216,244

(22) Filed: Dec. 11, 2018

(65) Prior Publication Data

US 2019/0187925 A1 Jun. 20, 2019

(30) Foreign Application Priority Data

Dec. 20, 2017 (JP) ................................. 2017-244539

(51) Int. Cl.
*G06F 3/06* (2006.01)
*G06F 12/02* (2006.01)

(52) U.S. Cl.
CPC .......... *G06F 3/0652* (2013.01); *G06F 3/0608* (2013.01); *G06F 3/0641* (2013.01); *G06F 3/0658* (2013.01); *G06F 3/0673* (2013.01); *G06F 12/0253* (2013.01)

(58) Field of Classification Search
CPC ............................ G06F 12/0246; G06F 3/0608
See application file for complete search history.

(56) References Cited

U.S. PATENT DOCUMENTS

| | | | | |
|---|---|---|---|---|
| 5,088,036 A | * | 2/1992 | Ellis | .................... G06F 12/0269 |
| 2005/0198079 A1 | * | 9/2005 | Heeb | ......................... G06F 8/52 |
| 2010/0030260 A1 | * | 2/2010 | Fleischmann | .......... A61B 90/02 |
| | | | | 606/216 |
| 2011/0225214 A1 | | 9/2011 | Guo | |
| 2012/0166401 A1 | * | 6/2012 | Li | ....................... G06F 16/2246 |
| | | | | 707/692 |
| 2014/0372490 A1 | | 12/2014 | Barrus et al. | |
| 2015/0006475 A1 | * | 1/2015 | Guo | .................... G06F 16/1752 |
| | | | | 707/609 |
| 2017/0017571 A1 | * | 1/2017 | Choi | .................... G06F 12/0246 |
| 2018/0107404 A1 | * | 4/2018 | Cox | ...................... G06F 3/0641 |

FOREIGN PATENT DOCUMENTS

| | | |
|---|---|---|
| JP | 2013-522718 | 6/2013 |
| JP | 2016-526717 | 9/2016 |

* cited by examiner

*Primary Examiner* — Tammara R Peyton
(74) *Attorney, Agent, or Firm* — Fujitsu Patent Center

(57) ABSTRACT

A control device receives a first request signal for requesting to write first data in a first logical address area of a logical volume set stores the first data in a physical volume in accordance with the first request signal, erases, after receiving the first request signal, the first data in the first logical address area of the logical volume without erasing the first data in the physical volume, and when executing a first erasure processing for erasing the first data in the physical volume, holds the first data in the physical volume, in a case where history information for indicating that a second erasure processing has been executed prior to the first erasure processing is held, and erases the first data in the physical volume, in a case where the history information is not held.

20 Claims, 10 Drawing Sheets

| STATE | PROCESSING | LOGICAL VOLUME | PHYSICAL VOLUME | HASH VALUE | REFERENCE NUMBER |
|---|---|---|---|---|---|
| 1 | WRITING OF DATA A (FIRST LOGICAL ADDRESS) | WRITING OF DATA A (FIRST LOGICAL ADDRESS) | DATA A | a | 1 |
| 2 | WRITING OF DATA B (FIRST LOGICAL ADDRESS) | | DATA A | a | 0 |
| | | WRITING OF DATA B (FIRST LOGICAL ADDRESS) | DATA B | b | 1 |
| 3 | GARBAGE COLLECTION | WRITING OF DATA B (FIRST LOGICAL ADDRESS) | DATA B | b | 1 |
| 4 | WRITING OF DATA A (SECOND LOGICAL ADDRESS) | WRITING OF DATA B (FIRST LOGICAL ADDRESS) | DATA B | b | 1 |
| | | WRITING OF DATA A (SECOND LOGICAL ADDRESS) | DATA A | a | 1 |
| 5 | WRITING OF DATA C (SECOND LOGICAL ADDRESS) | WRITING OF DATA B (FIRST LOGICAL ADDRESS) | DATA B | b | 1 |
| | | | DATA A | a | 0 |
| | | WRITING OF DATA C (SECOND LOGICAL ADDRESS) | DATA C | c | 1 |
| 6 | GARBAGE COLLECTION | WRITING OF DATA B (FIRST LOGICAL ADDRESS) | DATA B | b | 1 |
| | | | DATA A | a | 0 |
| | | WRITING OF DATA C (SECOND LOGICAL ADDRESS) | DATA C | c | 1 |
| 7 | WRITING OF DATA A (THIRD LOGICAL ADDRESS) | WRITING OF DATA B (FIRST LOGICAL ADDRESS) | DATA B | b | 1 |
| | | WRITING OF DATA A (THIRD LOGICAL ADDRESS) | DATA A | a | 1 |
| | | WRITING OF DATA C (SECOND LOGICAL ADDRESS) | DATA C | c | 1 |

FIG. 2A

| STATE | PROCESSING | LOGICAL VOLUME | PHYSICAL VOLUME | HASH VALUE | REFERENCE NUMBER |
|---|---|---|---|---|---|
| 1 | WRITING OF DATA A (FIRST LOGICAL ADDRESS) | DATA A (FIRST LOGICAL ADDRESS) | DATA A | a | 1 |
| 2 | WRITING OF DATA A (SECOND LOGICAL ADDRESS) | DATA A (FIRST LOGICAL ADDRESS) DATA A (SECOND LOGICAL ADDRESS) | DATA A | a | 2 |

FIG. 2B

| STATE | PROCESSING | LOGICAL VOLUME | PHYSICAL VOLUME | HASH VALUE | REFERENCE NUMBER |
|---|---|---|---|---|---|
| 1 | WRITING OF DATA A (FIRST LOGICAL ADDRESS) | WRITING OF DATA A (FIRST LOGICAL ADDRESS) | DATA A | a | 1 |
| 2 | WRITING OF DATA B (FIRST LOGICAL ADDRESS) | WRITING OF DATA B (FIRST LOGICAL ADDRESS) | DATA A | a | 0 |
|   |   |   | DATA B | b | 1 |

FIG. 3

| STATE | PROCESSING | LOGICAL VOLUME | PHYSICAL VOLUME | HASH VALUE | REFERENCE NUMBER |
|---|---|---|---|---|---|
| 1 | WRITING OF DATA A (FIRST LOGICAL ADDRESS) | WRITING OF DATA A (FIRST LOGICAL ADDRESS) | DATA A | a | 1 |
| | | | DATA A | a | 0 |
| 2 | WRITING OF DATA B (FIRST LOGICAL ADDRESS) | WRITING OF DATA B (FIRST LOGICAL ADDRESS) | DATA B | b | 1 |
| 3 | GARBAGE COLLECTION | WRITING OF DATA B (FIRST LOGICAL ADDRESS) | DATA B | b | 1 |

FIG. 4

| STATE | PROCESSING | LOGICAL VOLUME | PHYSICAL VOLUME | HASH VALUE | REFERENCE NUMBER |
|---|---|---|---|---|---|
| 1 | WRITING OF DATA A (FIRST LOGICAL ADDRESS) | WRITING OF DATA A (FIRST LOGICAL ADDRESS) | DATA A | a | 1 |
| 2 | WRITING OF DATA B (FIRST LOGICAL ADDRESS) | WRITING OF DATA B (FIRST LOGICAL ADDRESS) | DATA A | a | 0 |
| | | | DATA B | b | 1 |
| 3 | GARBAGE COLLECTION | WRITING OF DATA B (FIRST LOGICAL ADDRESS) | DATA B | b | 1 |
| 4 | WRITING OF DATA A (SECOND LOGICAL ADDRESS) | WRITING OF DATA B (FIRST LOGICAL ADDRESS) | DATA B | b | 1 |
| | | WRITING OF DATA A (SECOND LOGICAL ADDRESS) | DATA A | a | 1 |
| 5 | WRITING OF DATA C (SECOND LOGICAL ADDRESS) | WRITING OF DATA B (FIRST LOGICAL ADDRESS) | DATA B | b | 1 |
| | | WRITING OF DATA C (SECOND LOGICAL ADDRESS) | DATA A | a | 0 |
| | | | DATA C | c | 1 |
| 6 | GARBAGE COLLECTION | WRITING OF DATA B (FIRST LOGICAL ADDRESS) | DATA B | b | 1 |
| | | WRITING OF DATA C (SECOND LOGICAL ADDRESS) | DATA C | c | 1 |
| 7 | WRITING OF DATA A (THIRD LOGICAL ADDRESS) | WRITING OF DATA B (FIRST LOGICAL ADDRESS) | DATA B | b | 1 |
| | | WRITING OF DATA C (SECOND LOGICAL ADDRESS) | DATA C | c | 1 |
| | | WRITING OF DATA A (THIRD LOGICAL ADDRESS) | DATA A | a | 1 |

FIG. 5

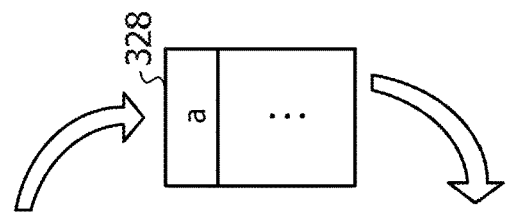

| STATE | PROCESSING | LOGICAL VOLUME | PHYSICAL VOLUME | HASH VALUE | REFERENCE NUMBER |
|---|---|---|---|---|---|
| 1 | WRITING OF DATA A (FIRST LOGICAL ADDRESS) | WRITING OF DATA A (FIRST LOGICAL ADDRESS) | DATA A | a | 1 |
| 2 | WRITING OF DATA B (FIRST LOGICAL ADDRESS) | WRITING OF DATA B (FIRST LOGICAL ADDRESS) | DATA A | a | 0 |
|   |   |   | DATA B | b | 1 |
| 3 | GARBAGE COLLECTION | WRITING OF DATA B (FIRST LOGICAL ADDRESS) | DATA B | b | 1 |
| 4 | WRITING OF DATA A (SECOND LOGICAL ADDRESS) | WRITING OF DATA B (FIRST LOGICAL ADDRESS) | DATA B | b | 1 |
|   |   | WRITING OF DATA A (SECOND LOGICAL ADDRESS) | DATA A | a | 1 |
| 5 | WRITING OF DATA C (SECOND LOGICAL ADDRESS) | WRITING OF DATA B (FIRST LOGICAL ADDRESS) | DATA B | b | 1 |
|   |   |   | DATA A | a | 0 |
|   |   | WRITING OF DATA C (SECOND LOGICAL ADDRESS) | DATA C | c | 1 |
| 6 | GARBAGE COLLECTION | WRITING OF DATA B (FIRST LOGICAL ADDRESS) | DATA B | b | 1 |
|   |   |   | DATA A | a | 0 |
|   |   | WRITING OF DATA C (SECOND LOGICAL ADDRESS) | DATA C | c | 1 |
| 7 | WRITING OF DATA A (THIRD LOGICAL ADDRESS) | WRITING OF DATA B (FIRST LOGICAL ADDRESS) | DATA B | b | 1 |
|   |   | WRITING OF DATA A (THIRD LOGICAL ADDRESS) | DATA A | a | 1 |
|   |   | WRITING OF DATA C (SECOND LOGICAL ADDRESS) | DATA C | c | 1 |

DEDUPLICATION STORAGE SYSTEM HAVING GARBAGE COLLECTION CONTROL METHOD

CROSS-REFERENCE TO RELATED APPLICATION

This application is based upon and claims the benefit of priority of the prior Japanese Patent Application No. 2017-244539, filed on Dec. 20, 2017, the entire contents of which are incorporated herein by reference.

FIELD

The embodiments discussed herein are related to a storage system, a control device, and a control method.

BACKGROUND

A deduplication technology has been developed to compress the amount of data stored in a storage device of a storage system. In a deduplication technology, when new data is written in the logical volume set in the storage device, it is determined whether the same data is already stored in an address area of the physical volume set in the storage device. Further, when the same data is already stored, a process of associating the corresponding data with the already stored data is performed without newly writing the corresponding data in another address area of the physical volume. Thus, the data stored in the physical volume may be associated with a plurality of data in the logical volume, and the amount of data stored in the storage device may be compressed.

Also, in a case where the free capacity of the storage device is reduced, a process called a garbage collection is performed to increase the free capacity by erasing the data which becomes unnecessary as data stored in the storage device. The control device included in the storage system, for example, periodically monitors the free capacity of the storage device, and when the free capacity becomes less than or equal to a predetermined value, the control device selects erasable data among the data stored in the storage device. The selected data is then erased from the storage device by the garbage collection, and the free capacity of the storage device is secured.

Related technologies are disclosed in, for example, Japanese National Publication of International Patent Application Nos. 2013-522718 and 2016-526717.

SUMMARY

According to an aspect of the invention, a control device includes a memory, and a processor coupled to the memory and configured to receive a first request signal for requesting to write first data in a first logical address area of a logical volume set in a storage device, store the first data in a physical volume set in the storage device in accordance with the first request signal, erase, after receiving the first request signal, the first data in the first logical address area of the logical volume without erasing the first data in the physical volume, and when executing a first erasure processing for erasing the first data in the physical volume, hold the first data in the physical volume, in a case where history information for indicating that a second erasure processing has been executed prior to the first erasure processing is held, the second erasure processing being for erasing second data same as the first data in the physical volume, and erase the first data in the physical volume, in a case where the history information is not held.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A and 2B are diagrams for explaining a deduplication processing performed by a control device;

FIG. 3 is a diagram for explaining a garbage collection based on a reference number;

FIG. 4 is a diagram for explaining a problem where an erasure of data by the garbage collection and rewriting of the same data as the erased data are repeated;

FIG. 5 is a diagram for explaining a control method of the garbage collection using a management table and a hash link;

DESCRIPTION OF EMBODIMENTS

Figure 1:
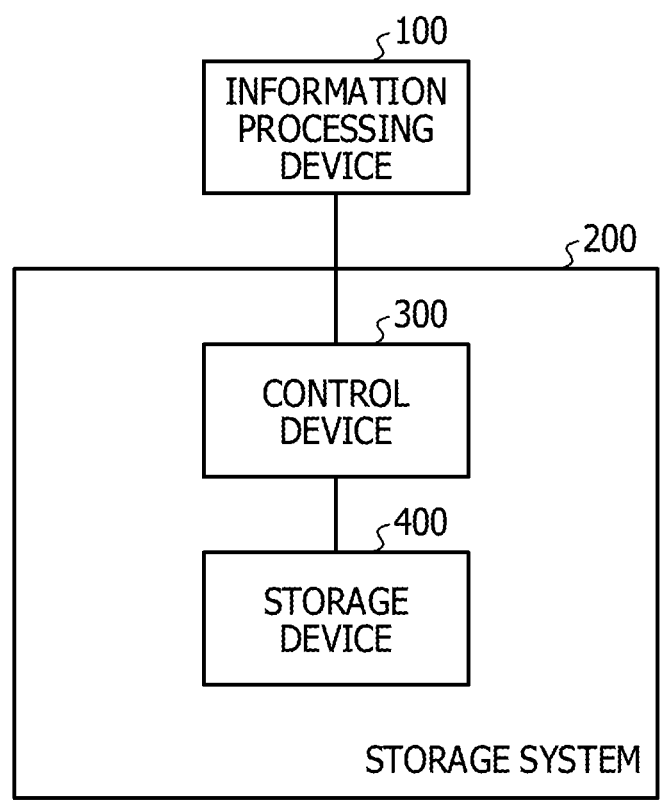
FIG. 1 is a diagram illustrating the structure of a storage system.

When a data write request is made with respect to a storage system and the same data as the write request target data is already stored in the storage device, the data write processing may be omitted using the deduplication technology. In the meantime, when the same data stored in the storage device is erased by the garbage collection before the data write request is made, it is necessary to rewrite the data.

In the present embodiment, a technology has been disclosed to suppress the number of times of writing the same data in a storage device of a storage system to which a deduplication technology is applied. The control device that controls the storage device receives a write request signal requesting writing of first data in a first logical address area of the logical volume set in the storage device (hereinafter, a write command). The control device stores the first data in the physical volume set in the storage device in accordance with the write command. Thereafter, the first data in the first logical address area of the logical volume is erased without erasing the first data stored in the physical volume. This processing occurs, for example, when the control device receives a write command requesting an overwriting of the first data stored in the first logical address area of the logical volume with different data from the first data. In this case, in the logical volume, the control device updates the first data in the first logical address area to second data, while in the physical volume, the control device writes the second data in another address area of the physical volume without erasing the first data. As described above, the processing in which data is not overwritten in the physical volume but new data is added and stored while the original data remains is performed, for example, in a storage system to which an additional-write type deduplication technology is applied. As a result of this processing, there occurs a state in which the first data exists in the physical volume but does not exist in the logical volume. When the garbage collection for the physical volume is performed in this state, the presence or absence of the history information indicating that the same data as the first data is deleted from the physical volume before the garbage collection is referred to. When the history information indicating that the same data as the first data is deleted from the physical volume is held in the storage system, the first data is maintained in the physical volume without being erased. When the history information is held in the storage system, it is considered that an erasure processing and a writing processing for the first data may be repeated. Therefore, when a write command requesting writing of the same data as that of the first data is received, it becomes possible to omit the rewriting processing of the first data by the deduplication technology by holding the first data without erasing the first data from the physical volume. In the meantime, when the history information is not held, it is possible to secure the free capacity of the storage device by erasing the first data from the physical volume.

FIG. 1 is a diagram illustrating the structure of a storage system. In FIG. 1, the storage system 200 is connected to an information processing device 100. The storage system 200 includes a control device 300 and a storage device 400.

The information processing device 100 is, for example, a host server, and stores data in the storage device 400 by transmitting a data write command to the storage system 200. A data storage area of the storage device 400 that is recognizable by the information processing device 100 is called a logical volume, and a physical data storage area allocated to the information processing device 100 in the storage device 400 is called a physical volume. The information processing device 100 transmits data to be written and information indicating an address in the logical volume of the data (logical address) to the storage system 200 when transmitting the write command to the storage system 200.

The control device 300 is a control module (CM) configured to control, for example, the storage device 400. The control device 300 receives the write command from the information processing device 100 and stores the data in the storage device 400 (physical volume) based on the received write command. Further, the control device 300 generates and holds address correspondence information indicating a correspondence between physical addresses and logical addresses that represent areas where data is stored in the physical volume. Although the control device 300 and the storage device 400 are illustrated separately in FIG. 1, the storage system 200 may constitute a redundant array of disks (RAID) including a plurality of control devices 300 and a plurality of storage devices 400.

FIGS. 2A and 2V are diagrams for explaining a deduplication processing performed by the control device 300. As described above, in the storage system 200, the logical volume recognized by the information processing device 100 and the physical volume which is a physical data storage area in which data is actually written in the storage device 400 are separated from each other. For example, as illustrated in FIG. 2A, in the first state, it is assumed that the information processing device 100 transmits a write command that specifies a first logical address and data A to be written to the storage system 200. In this case, based on the write command, the control device 300 stores the data A, for example, in a first physical address area of the physical volume of the storage device 400. Then, the control device 300 registers the address correspondence information indicating a correspondence between the first logical address and a first physical address in a management table. After the data A is stored in the first physical address area, for example, the garbage collection may cause the storage location of the data A to change to a different physical address from the first physical address area. Therefore, the physical address in which the data A is stored in the physical volume is not illustrated in the figure. When the physical address of the data A is changed, the address correspondence information registered in the management table is updated.

In addition, the control device 300 calculates, for example, a hash value of the data A (here, referred to as "a") as an identifier that specifies the data A. The hash value "a" is registered in the management table in association with the data A. Further, a reference number "1" indicating that the data A stored in the physical volume corresponds to the data A (one) of the first logical address in the logical volume, is registered in the management table. The technical significance of the reference number will be described later in detail.

In FIG. 2A, in the second state after the first state, it is assumed that the storage system 200 further receives a write command that specifies a second logical address and the data A to be written. In this case, the control device 300 determines whether the same data as the data A, which is the target data of the write command, is already stored in the physical volume. Specifically, the control device 300 calculates a hash value with respect to the data A which is the target data of the write command. The hash value for the data A is "a." Next, the control device 300 determines whether a hash value identical to the calculated hash value "a" is registered in the management table. In FIG. 2A, the hash value "a" in the first state is registered in the management table. Therefore, the control device 300 may recognize that the same data as the data A is already stored in the physical volume. In this case, the control device 300 does not perform a processing of newly writing the data A in another physical address based on the function of deduplication. The address correspondence information registered in the management table is updated to indicate that both the first logical address and the second logical address correspond to the data A stored in the physical volume. Further, the reference number registered in the management table is changed from "1" to "2." The reference number "2" indicates that the data A stored in the physical volume corresponds to the data of the two logical addresses of the first logical address and the second logical address.

With reference to FIG. 2B, an additional-write type deduplication processing will be described. The first state in FIG. 2B represents the same state as the first state in FIG. 2A. That is, the information processing device 100 transmits a write command that specifies the first logical address and the data A to the storage system 200, and the control device 300 stores the data A in the physical volume of the storage device 400. The address correspondence information that indicates the address correspondence relationship between the logical volume and the physical volume, the hash value "a" of the data A, and the reference number "1" are registered in the management table. Next, in FIG. 2B, in the second state after the first state, it is assumed that the storage system 200 further receives the write command that specifies the first logical address and the data B to be written. That is, the write command is a command that requests an overwriting of the data A written in the first state by data B. In this case, the control device 300 first calculates a hash value of the data B (here, referred to as "b"), and determines whether the hash value "b" is registered in the management table. In FIG. 2B, since the hash value "b" is not registered in the management table, the control device 300 may recognize that the data B is not stored in the physical volume. Therefore, the control device 300 newly stores the data B in the physical volume. Here, in the logical volume, the data A is overwritten and erased by the data B, but in the physical volume, the data B is newly written in a physical address area different from the physical address area where the data A is stored, and the data A is held in the physical volume. The reference number is then updated to "0" to indicate that the data A held in the physical volume does not correspond to any data in the logical volume. Further, in the second state, the reference number of the data B becomes "1."

FIG. 3 is a diagram for explaining a garbage collection that is based on a reference number. The garbage collection is a processing that is performed to increase the amount of free capacity in the physical volume. That is, data that is stored in the physical volume but is not actually referred to is erased by the garbage collection. More specifically, among the data stored in the physical volume, the data in which the reference number is "0," that is, the data that does not correspond to any data in the logical volume is selected by the control device 300 as a target of garbage collection. For example, when the free capacity of the physical volume becomes equal to or less than a predetermined value or on a periodic basis, data selected as a target of garbage collection is erased in the physical volume.

The first state and the second state illustrated in FIG. 3 represent the same states as the first state and the second state illustrated in FIG. 2B, the reference number of the data A is "0," and the reference of the data B is "1." In FIG. 3, the garbage collection is performed as a third state after the second state. In the third state, the control device 300 determines whether there is data whose reference number is "0." Here, the reference number of the data A in the second state is registered as "0." Therefore, the control device 300 erases the data A held in the physical volume in the garbage collection. As a result, the free capacity of the physical volume is secured. Also, as the data A is erased from the physical volume, the hash value "a" of the data A is also deleted from the management table.

FIG. 4 is a diagram for explaining a problem in a case where an erasure of data by the garbage collection and rewriting of the same data as the erased data are repeated. The first to third states illustrated in FIG. 4 are respectively equivalent to the first to third states illustrated in FIG. 3, and the garbage collection is executed in the third state so that the data A in the physical volume is erased.

In a fourth state after the third state, a write command of the data A to the second logical address is input from the information processing device 100 to the storage system 200. In this case, the control device 300 calculates the hash value "A" of the data A and determines whether the hash value "A" is registered in the management table. As described above, in the third state, the data A is erased from the physical volume, and the hash value "a" is also deleted from the management table. Therefore, the control device 300 recognizes that the data A is not stored in the physical volume. Then, the control device 300 newly stores the data A in the physical volume, and the address correspondence information for the data A, the hash value "a" of the data A, and the reference number "1" are registered in the management table.

In a fifth state after the fourth state, a write command of data C to the second logical address is input from the information processing device 100 to the storage system 200. That is, in the logical volume, the data A is overwritten by the data C in the second logical address, and the data C is newly stored in another physical address area, while the data A is held in the physical volume. In addition, the address correspondence information for the data C, the hash value of the data C (here, referred to as "c"), and the reference number "1" are registered in the management table. The reference number of the data A is then updated to "0."

After the fifth state, the garbage collection is performed in a sixth state. The control device 300 determines whether there is data in which the reference number is "0" in the management table. Here, the reference number of the data A erased in the logical volume in the fifth state is "0." Thus, the control device 300 erases the data A in the physical volume in the garbage collection.

In a seventh state after the sixth state, a write command of the data A to the third logical address is input from the information processing device 100 to the storage system 200. Since the data A is erased in the physical volume in the sixth state, the control device 300 newly stores the data A in another address area of the physical volume.

As described above, in FIG. 4, in the third state, the data A is erased in the physical volume by the garbage collection, and then the data A is stored in the physical volume in the fourth state. Further, in the sixth state, the data A is erased in the physical volume by the garbage collection, and then the data A is stored in the physical volume in the seventh state. In other words, the data A is erased and stored in the physical volume repeatedly. Such repeated erasure and storage of the same data increases the processing load of the control device 300. In addition, the number of times of rewriting of the data storage area of the physical volume is increased. In the case of a solid state drive (SSD) in which the storage device 400 is composed of, for example, a flash memory, the performance of the storage device 400 deteriorates due to an increase in the number of times of rewriting.

A method of solving such a problem will be described with reference to FIG. 5. FIG. 5 is a diagram for explaining a control method of the garbage collection using a management table and a hash link.

The first state and the second state illustrated in FIG. 5 have the same contents as the first state and the second state in FIG. 4, respectively. In the third state, the garbage collection is executed so that the data A having a reference number "0" is erased from the physical volume. At this time, the hash value "a" of the erased data A is registered in a hash link 328. The hash link 328 is a buffer that sequentially stores the hash values that corresponds to the erased data. The fact that the hash value that corresponds to the erased data is held in the hash link 328 indicates that there is a history that the data has been erased from the physical volume by the garbage collection in the past. Therefore, in the present specification, the hash link 328 is also referred to as a "history information holding unit." Further, the hash value held in the history information holding unit is also referred to as "history information" which indicates the history in which the corresponding data is erased from the physical volume.

As illustrated in FIG. 5, in the third state, the hash value "a" is registered, for example, at the head position of the hash link 328. The hash link 328 is controlled such that the hash value that corresponds to the recently erased data is registered at the head position and the hash value of the oldest erased data is registered at the end. An upper limit value is set to the number of hash values that may be registered in the hash link 328. When the number of hash values registered in the hash link 328 exceeds the upper limit value, that is, when the number of registered hash values exceeds the capacity of the hash link 328, the hash value at the end of the hash link 328 is deleted.

The fourth state in FIG. 5 is the same as the fourth state in FIG. 4, and the write command of the data A to the second logical address is input from the information processing device 100 to the storage system 200. At this time, since the data A is not stored in the physical volume, the control device 300 newly stores the data A in the physical volume, and the address correspondence information of the data A, the hash value "a" of the data A, and the reference number "1" are registered in the management table.

The fifth state in FIG. 5 is the same as the fifth state in FIG. 4, and the write command of the data C to the second logical address is input from the information processing device 100 to the storage system 200. The data C is stored in another physical address area while the data A is held in the physical volume, and the reference number corresponding to the data A is updated to "0."

Next, the garbage collection is executed in the sixth state. Here, the control device 300 selects the data whose reference number is "0" in the management table in order to select candidates of data to be erased. In this example, the data A in which the reference number is "0" in the fifth state is selected. Further, the control device 300 refers to the hash link 328. The registered hash value "a" in the third state is held in the hash link 328. The fact that the hash value is registered in the hash link 328 indicates that the data that corresponds to the hash value has been deleted in the past. That is, with respect to the data A that corresponds to the hash value "a," there is a possibility that storage and erasure may be repeated thereafter. Therefore, even when the reference number is "0," when the hash value that corresponds to the data is registered in the hash link 328, the control device 300 does not consider the data as a target to be erased by the garbage collection. Thus, in the sixth state, the data A is not erased from the physical volume, but held in the physical volume.

In the seventh state after the sixth state, a write command of the data A to the third logical address is input from the information processing device 100 to the storage system 200. As described above, the data A is not erased in the physical volume in the sixth state. Therefore, the control device 300 does not store the data A in the physical volume, but registers the address correspondence information of the data A in the management table and changes the reference number of the data A from "0" to "1."

As described above, in the present embodiment, when data is erased from the physical volume, history information that indicates that the data has been erased such as, for example, the hash value, is held in the history information holding unit such as, for example, held in the hash link 328. In the garbage collection, the data whose history information is held in the history information holding unit does not become a target to be erased by the garbage collection, even when the reference number is "0." Therefore, the data is held in the physical volume without being erased by the garbage collection. Then, when a write command for the same data is received, the data writing processing to the physical volume is omitted so that the processing load required for data writing of the control device 300 and the number of times of data rewriting of the storage device 400 may be suppressed. In addition, since the upper limit value is set for the number of pieces of history information that may be held in the history information holding unit, the free capacity of the storage device 400 may be appropriately maintained.

Figure 6A:
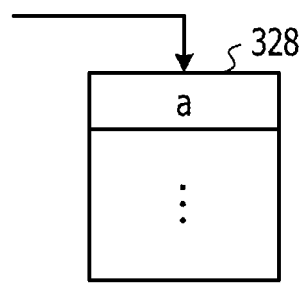
FIGS. 6A to 6D are views for explaining a method of controlling a hash link, which is an example of a history information holding unit.
Figure 6C:
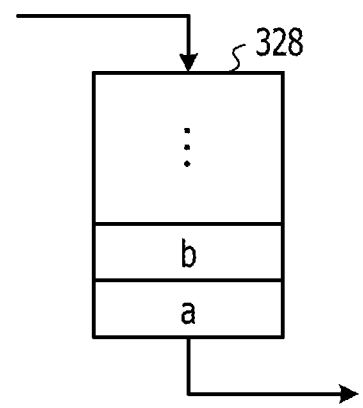
Figure 6B:
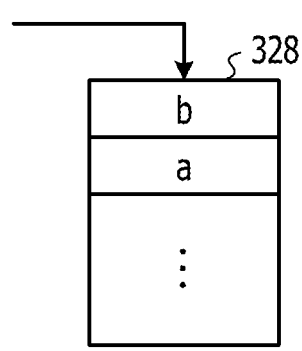

FIGS. 6A to 6D are views for explaining a method of controlling the hash link 328, which is an example of a history information holding unit. As illustrated in FIG. 6A, when the data A is erased by the garbage collection, the hash value "a" is registered at the head position of the hash link 328. Then, as illustrated in FIG. 6B, when another hash value "b" is registered in the hash link 328, the hash value "b" is registered at the head position of the hash link 328, and the hash value "a" moves to the rear area in the hash link 328. As the hash value is newly registered in the hash link 328 in this manner, the old hash values are moved to the lower area in order. While the hash value is held in the hash link 328, the data that corresponds to the hash value does not become a target to be erased by the garbage collection. Therefore, the data is held in the physical volume so that it is possible to suppress the data erasure and the writing from being repeated with respect to the same data.

As illustrated in FIG. 6C, when the hash value "a" is at the end of the hash link 328 and a new hash value is added to the hash link 328, the hash value "a" is deleted from the hash link 328. As described above, for the data that has been deleted for a long period of time compared to other data, the hash value is deleted from the hash link 328, so that the data becomes a target to be erased by the garbage collection. As a result, it becomes possible to appropriately secure the free capacity of the physical volume.

Figure 6D:
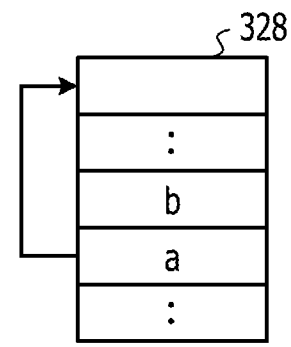

Further, as illustrated in FIG. 6D, when the reference number of certain data is "0" and the corresponding data is not erased because the hash value of the data exists in the hash link 328, the hash value of the data is moved to the head position of the hash link 328. Thus, the data having the reference number "0" is moved to the upper side of the hash link 328 while the hash value of the data having the reference number other than "0" is moved to the lower side of the hash link 328. Therefore, the hash value of the data whose reference number is not "0" may be deleted from the hash link 328 preferentially, so that the hash value of the data whose reference number is "0" remains in the hash link 328. In addition, the data whose reference number is not "0" does not become a target to be erased by the garbage collection even when the hash value remains in the hash link 328.

Figure 7:
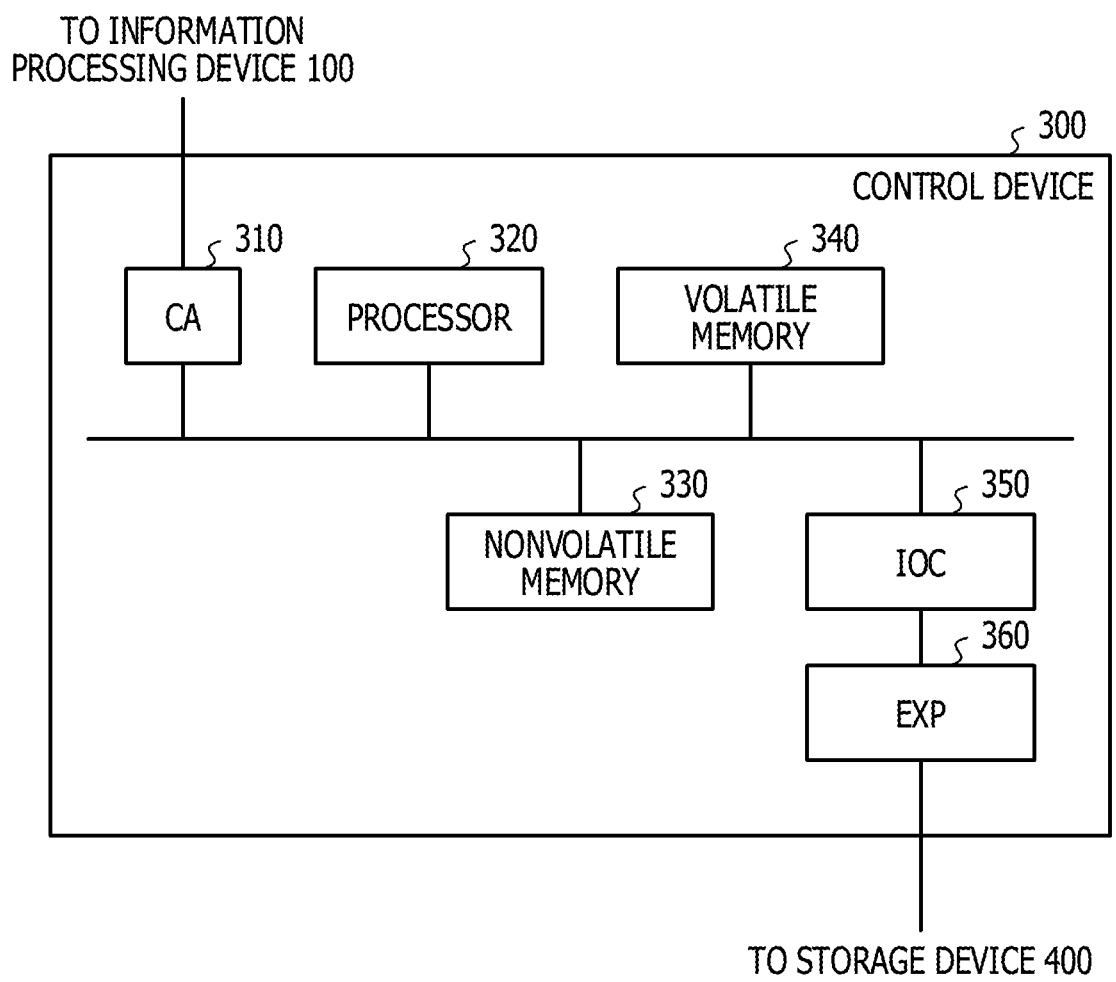
FIG. 7 is a diagram illustrating a hardware configuration of the control device.

FIG. 7 is a diagram illustrating a hardware configuration of the control device 300. The control device 300 includes a channel adapter (CA) 310, a processor 320, a nonvolatile memory 330, a volatile memory 340, an input-output controller (IOC) 350, and an expander (EXP) 360.

The CA 310 is an interface circuit for the information processing device 100 and receives a write command along with data from the information processing device 100. The data read from the storage device 400 is transmitted to the information processing device 100 via the CA 310.

The processor 320 loads the computer program stored in the nonvolatile memory 330 into the volatile memory 340 and executes the computer program. For example, the processor 320 executes a writing process of data to the storage device 400 in accordance with the reception of the write command. The processor 320 may be a hardware processor, and a field programmable gate array (FPGA) and an application specific integrated circuit (DSP) may be applicable as well as a central processing unit (CPU), a micro control unit (MCU), and a micro processing unit (ASIC).

The nonvolatile memory 330 is a computer-readable recording medium. A computer program and the like executed by the processor 320 are stored in the nonvolatile memory 330. Examples of the nonvolatile memory 330 include, for example, a read only memory (ROM), a mask read only memory, a programmable read only memory (PROM), a flash memory, a magnetoresistive random access memory (MRAM), a resistive random access memory (Re-RAM), and a ferroelectric random access memory (Fe-RAM). The computer program may be recorded in a computer-readable recording medium (except for a carrier wave) as a storage medium other than the non-volatile memory 330. In addition, a portable recording medium such as a digital versatile disc (DVD) or a compact disc read only memory (CD-ROM) in which a computer program is recorded may be distributed. The computer program may also be transmitted over a network.

The volatile memory 340 is a computer-readable recording medium. A computer program stored in the nonvolatile memory 330 is loaded in the volatile memory 340. Data used in an arithmetic processing by the processor 320, and data obtained as a result of the arithmetic processing may be held in the volatile memory 340. Examples of the volatile memory 340 include, for example, a static random access memory (SRAM), and a dynamic random access memory (DRAM).

The IOC 350 controls the transmission and reception of data to be performed between the control device 300 and the storage device 400. The EXP 360 relays the transmission and reception of data to be performed between the control device 300 and the storage device 400.

Figure 8:
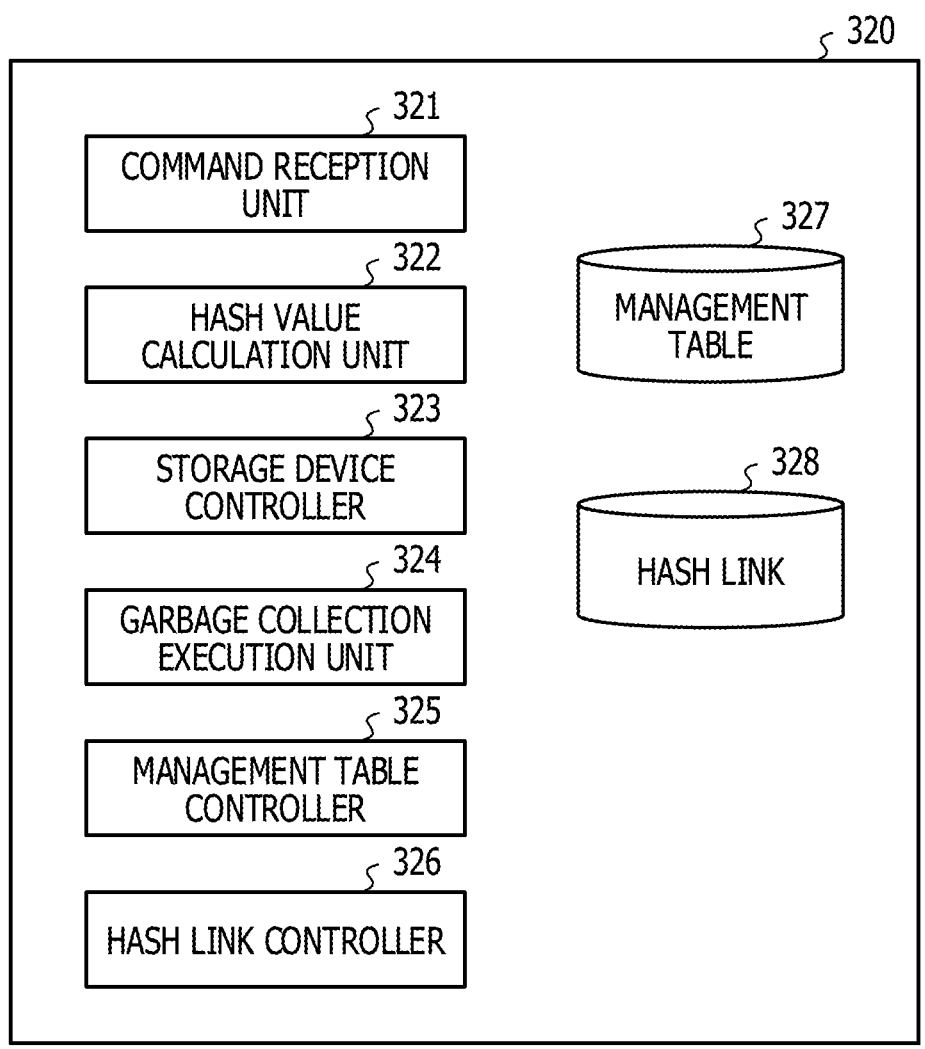
FIG. 8 is a functional block diagram of a processor of the control device.

FIG. 8 is a functional block diagram of a processor 320 of the control device 300. The processor 320 of the control device 300 executes, for example, the computer program stored in the nonvolatile memory 330 to function as a command reception unit 321, a hash value calculation unit 322, a storage device controller 323, a garbage collection execution unit 324, a management table controller 325, and a hash link controller 326. Further, the processor 320 of the control device 300 holds the management table 327 and the hash link 328. The management table 327 and the hash link 328 may also be held in a device other than the processor 320, for example, the volatile memory 340.

The command reception unit 321 receives a write command, for example, from the information processing device 100. When the command reception unit 321 receives a write command, the hash value calculation unit 322 calculates a hash value of data which becomes a write request target. The storage device controller 323 executes data writing to the storage device 400. The deduplication processing is also performed by the storage device controller 323. The garbage collection execution unit 324 executes garbage collection of the storage device 400. The garbage collection execution unit 324 controls the selection of data to be deleted from the physical volume and the execution of the garbage collection based on the reference number held in the management table 327 and the hash value held in the hash link 328. The management table controller 325 manages the contents of the management table 327 to register the hash value and update the reference number. The management table controller 325 also registers the address correspondence information of the logical address and the physical address in the management table 327. The hash link controller 326 controls the registration of the hash value in the hash link 328, the deletion thereof from the hash link 328, and the change of the position of the hash value in the hash link 328, and the like.

Figure 9:
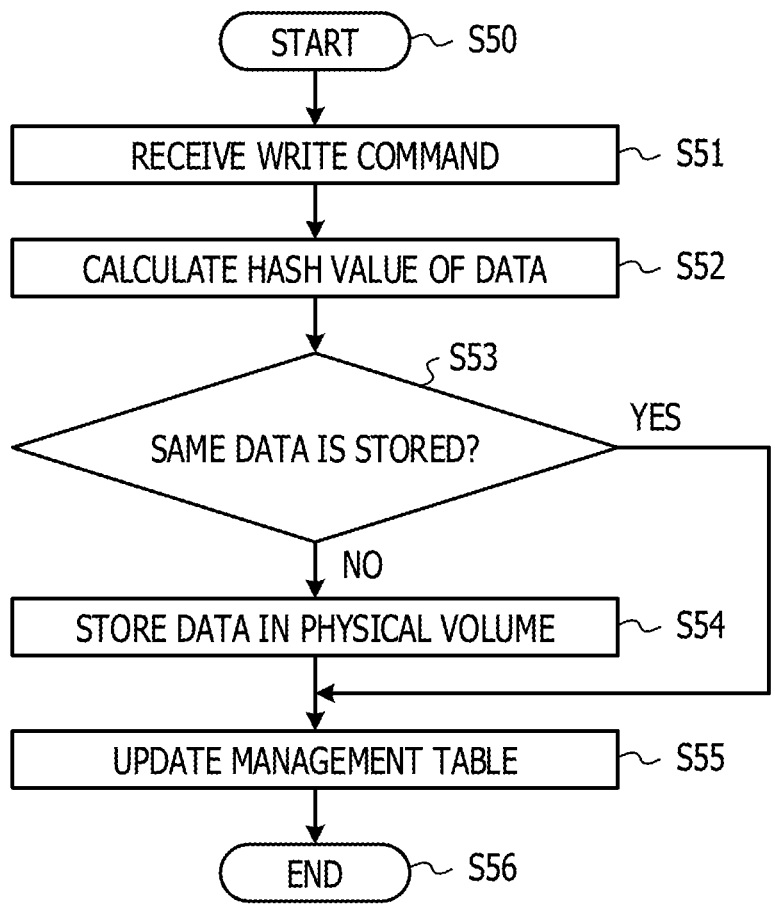
FIG. 9 is a flowchart of a processing executed by the processor of the control device, and mainly explains a processing performed when a write command is received from an information processing device.

FIG. 9 is a flowchart of a processing executed by the processor 320 of the control device 300, and mainly explains a processing performed when a write command is received from an information processing device 100. The processing flow starts in operation S50, and in operation S51, the command reception unit 321 receives the write command transmitted from the information processing device 100. In operation S52, the hash value calculation unit 322 calculates a hash value with respect to the target data of the write command. In operation S53, the storage device controller 323 determines whether the same hash value as the calculated hash value is registered in the management table 327 to determine whether the same data as the write target data is stored in the storage device 400. When it is determined that the same data is stored in the storage device 400 ("YES" in operation S53), the processing flow proceeds to operation S55, and when it is determined that the same data is not stored in the storage device 400 ("NO" in S53), the processing flow proceeds to operation S54.

In operation S54, the storage device controller 323 stores the data in the physical volume of the storage device 400. In operation S55, the management table controller 325 updates the management table 327. Specifically, when the processing flow proceeds from operation S53 to operation S54, the address correspondence information that indicates the correspondence between the logical address designated by the write command and the physical address where the data is recorded, the hash value of the data, and the reference number "1" are newly registered in the management table 327. When the processing flow proceeds from operation S53 to operation S55, the address correspondence information that indicates the correspondence between the logical address designated by the write command and the physical address where the same data as the data requested to be written is stored, is registered in the management table 327 so that the reference number is increased by "1." Thereafter, the processing flow ends in operation S56.

Figure 10:
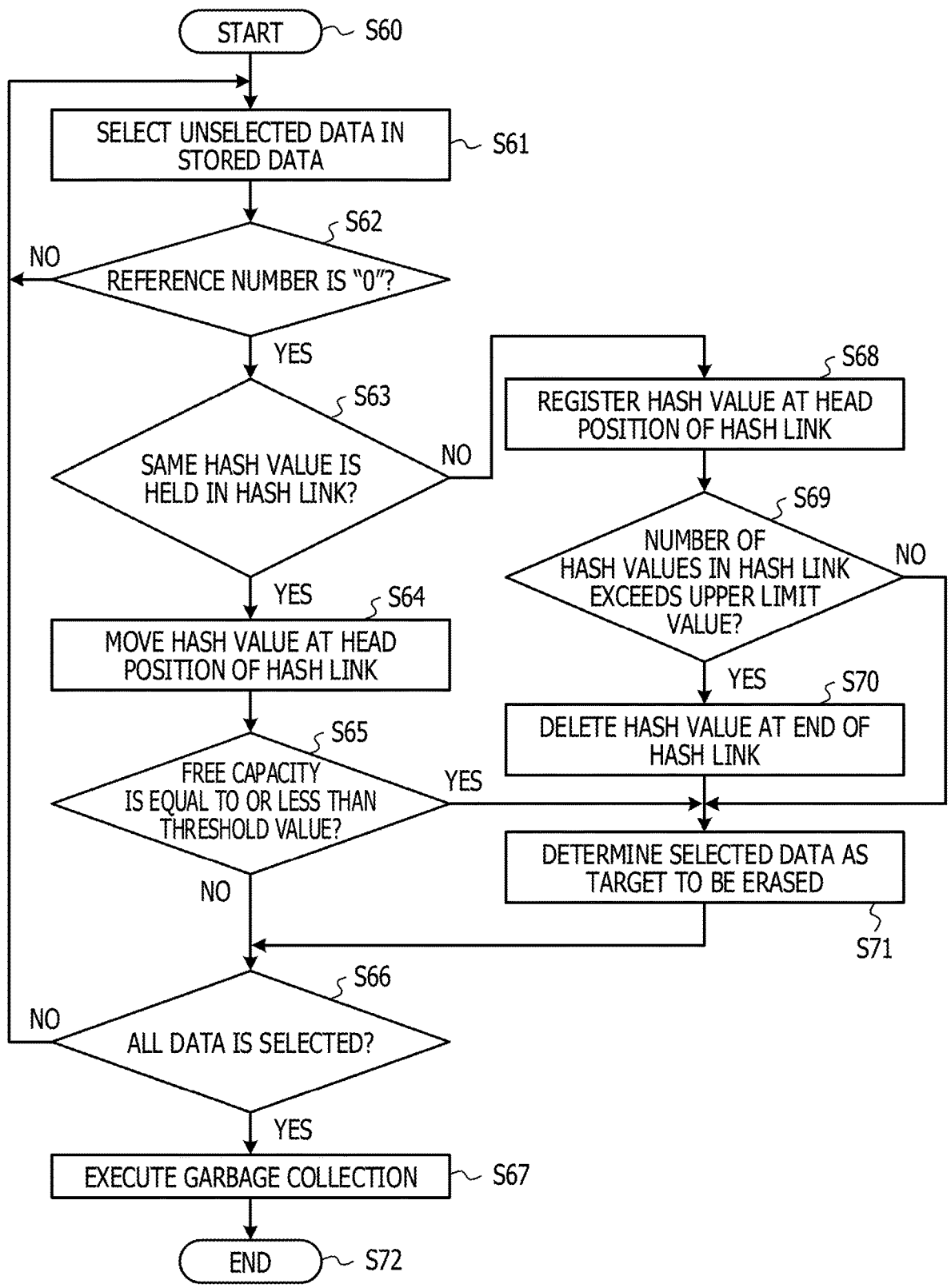
FIG. 10 is a flowchart of the processing performed by the processor of the control device, and mainly explains the processing related to the garbage collection.

FIG. 10 is a flowchart of the processing performed by the processor 320 of the control device 300, and mainly explains the processing related to the garbage collection. The processing flow starts in operation S60, and in operation S61, the garbage collection execution unit 324 selects unselected data among the data stored in the physical volume. In operation S62, the garbage collection execution unit 324 refers to the management table 327 to determine whether the reference number of the selected data is "0." When the reference number is determined to be "0" ("YES" in operation S62), the processing flow proceeds to operation S63. When the reference number is not determined to be "0" ("NO" in operation S62), the processing flow returns to operation S61 so that the other unselected data is selected.

In operation S63, the garbage collection execution unit 324 determines whether the same hash value as the hash value of the selected data is held in the hash link 328. When it is determined that the same hash value is held in the hash link 328 ("YES" in operation S63), the processing flow proceeds to operation S64. When it is determined that the same hash value is not held in the hash link 328 ("NO" in operation S63), the processing flow proceeds to operation S68.

When the processing flow proceeds to operation S68, the hash link controller 326 registers the hash value of the selected data at the head position of the hash link 328 in operation S68. In operation S69, the hash link controller 326 determines whether the number of hash values held in the hash link 328 exceeds the set upper limit value. When it is determined that the number of hash values exceeds the set upper limit value ("YES" in operation S69), the processing flow proceeds to operation S70. When it is determined that the number of hash values does not exceed the set upper limit value ("NO" in operation S69), the processing flow proceeds to operation S71. The hash link controller 326 deletes the hash value registered at the end of the hash link 328 from the hash link 328 in operation S70. In operation S71, the garbage collection execution unit 324 determines the selected data as data to be erased by the garbage collection. Thereafter, the processing flow proceeds to operation S66.

In the meantime, when the processing flow proceeds from operation S63 to operation S64, the hash link controller 326 moves the hash value, which is the same as the hash value of the selected data, to the head position of the hash link 328 in operation S64. In operation S65, the garbage collection execution unit 324 determines whether the free capacity of the physical volume is equal to or less than a threshold value. When it is determined that the free capacity is equal to or less than the threshold value ("YES" in operation S65), the processing flow proceeds to operation S71, and the selected data is determined as data to be erased by the garbage collection. When it is determined that the free capacity is not equal to or less than the threshold value ("NO" in operation S65), the processing flow proceeds to operation S66. When the free capacity of the physical volume is particularly small due to operation S65, even when the history information that indicates that the physical volume has been deleted in the past is held in the history information holding unit, the data whose reference number is "0" may be erased from the physical volume. Thus, the free capacity of the physical volume may be secured.

In operation S66, the garbage collection execution unit 324 determines whether all the data stored in the physical volume has been selected. When it is determined that all the data has been selected ("YES" in operation S66), the processing flow proceeds to operation S67, and when it is determined that all the data has not been selected ("NO" in operation S66), the processing flow returns to operation S61.

In operation S67, the garbage collection execution unit 324 performs the garbage collection to erase the data determined as data to be erased in operation S71 from the physical volume. Thereafter, the processing flow ends in operation S72.

As described above, in the method described by the embodiment of the present disclosure, the hash value of data erased by the garbage collection is registered in the hash link 328. Further, when the data which is stored in the physical volume and does not correspond to any data in the logical volume is erased by the garbage collection, it is determined whether the hash value of the data is held in the hash link 328. When the hash value is held in the hash link 328, the data is not erased according to the garbage collection, but is held in the physical volume. Therefore, when there is a write request of the same data thereafter, the data rewriting processing is omitted by the deduplication processing, and the processing load of the control device 300 is reduced.

Although the embodiments have been described above, the technical contents disclosed by the present disclosure are not limited to the contents disclosed in the embodiments. For example, the garbage collection has been described as an example of the processing of erasing the data of a physical volume in the embodiment. However, in the case of the erasure processing of erasing the data, the processing is not limited to the garbage collection. Further, although the hash value has been described as an example of an identifier that specifies the data, it is not limited to the hash value as long as the method is used to identify the data individually. Although the hash link 328 has been described as an example of the history information holding unit, it is not limited to the hash link 328 as long as the history information of a predetermined number is held.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device comprising:
a memory; and
a processor coupled to the memory and configured to:
receive a first request signal for requesting to write first data in a first logical address area of a logical volume set in a storage device;
store the first data in a physical volume set in the storage device in accordance with the first request signal;
erase, after receiving the first request signal, the first data in the first logical address area of the logical volume without erasing the first data in the physical volume; and
when executing a first erasure processing for erasing the first data in the physical volume,
hold the first data in the physical volume, in a case where history information for indicating that a second erasure processing has been executed prior to the first erasure processing is held, the second erasure processing being for erasing second data same as the first data in the physical volume, and
erase the first data in the physical volume, in a case where the history information is not held.

2. The control device according to claim 1,
wherein the processor is configured to, after receiving the first request signal, store third data in the first logical address area of the physical volume without erasing the first data stored in the physical volume in accordance with a second request signal for requesting to rewrite the first data of the first logical address area of the physical volume to the third data different from the first data.

3. The control device according to claim 1,
wherein the processor is further configured to:
receive, after holding the first data in the physical volume based on the history information, a third request signal for requesting to write fourth data same as the first data in a second logical address area of the logical volume; and
generate, in a case where the first data is held in the physical volume, address correspondence information for indicating a correspondence between the first data held in the physical volume and the second logical address area without storing the fourth data in the physical volume in accordance with the third request signal.

4. The control device according to claim 1,
wherein the processor is further configured to:
execute the second erasure processing prior to the first erasure processing, the second erasure processing being for erasing the second data in the physical volume, in a case where the second data is stored in the physical volume and is not stored in the logical volume; and
generate the history information based on the second data erased in the physical volume.

5. The control device according to claim 4,
wherein the processor is further configured to:
hold the history information in a buffer; and
determine whether the history information is held in the buffer or deleted from the buffer, based on a capacity of the buffer.

6. The control device according to claim 5,
wherein the processor is further configured to, in the second erasure processing:
hold the history information at a head position of the buffer;
move a holding position of the history information in the buffer to a rear area when holding the history information for fifth data different from the second data in the buffer; and
delete the history information from the buffer based on the capacity of the buffer, in a case where the history information is at an end of the buffer.

7. The control device according to claim 6,
wherein the processor is further configured to:
move the holding position of the history information in the buffer to the head position of the buffer, in a case where the history information is held in the buffer in the first erasure processing.

8. The control device according to claim 1,
wherein the history information is a hash value of the second data erased in the physical volume, and
wherein the first data is not erased in the physical volume, in a case where the hash value of the second data same as the hash value of the first data is held in the buffer in the first erasure processing.

9. A storage system comprising:
a storage device; and
a control device configured to include:
a memory, and
a processor coupled to the memory and configured to:
receive a first request signal for requesting to write first data in a first logical address area of a logical volume set in the storage device,
store the first data in a physical volume set in the storage device in accordance with the first request signal,
erase, after receiving the first request signal, the first data in the first logical address area of the logical volume without erasing the first data in the physical volume, and
when executing a first erasure processing for erasing the first data in the physical volume,
hold the first data in the physical volume, in a case where history information for indicating that a second erasure processing has been executed prior to the first erasure processing is held, the second erasure processing being for erasing second data same as the first data in the physical volume, and
erase the first data in the physical volume, in a case where the history information is not held.

10. The storage system according to claim 9,
wherein the processor is configured to, after receiving the first request signal, store third data in the first logical address area of the physical volume without erasing the first data stored in the physical volume in accordance with a second request signal for requesting to rewrite the first data of the first logical address area of the physical volume to the third data different from the first data.

11. The storage system according to claim 9,
wherein the processor is further configured to:
receive, after holding the first data in the physical volume based on the history information, a third request signal for requesting to write fourth data same as the first data in a second logical address area of the logical volume, and
generate, in a case where the first data is held in the physical volume, address correspondence information for indicating a correspondence between the first data held in the physical volume and the second logical address area without storing the fourth data in the physical volume in accordance with the third request signal.

12. The storage system according to claim 9,
wherein the processor is further configured to:
execute the second erasure processing prior to the first erasure processing, the second erasure processing being for erasing the second data in the physical volume, in a case where the second data is stored in the physical volume and is not stored in the logical volume, and
generate the history information based on the second data erased in the physical volume.

13. The storage system according to claim 12,
wherein the processor is further configured to:
hold the history information in a buffer, and
determine whether the history information is held in the buffer or deleted from the buffer, based on a capacity of the buffer.

14. The storage system according to claim 13,
wherein the processor is further configured to, in the second erasure processing:
hold the history information at a head position of the buffer,
move a holding position of the history information in the buffer to a rear area when holding the history information for fifth data different from the second data in the buffer, and
delete the history information from the buffer based on the capacity of the buffer, in a case where the history information is at an end of the buffer.

15. The storage system according to claim 14,
wherein the processor is further configured to:
move the holding position of the history information in the buffer to the head position of the buffer, in a case where the history information is held in the buffer in the first erasure processing.

16. The control device according to claim 9,
wherein the history information is a hash value of the second data erased in the physical volume, and
wherein the first data is not erased in the physical volume, in a case where the hash value of the second data same as the hash value of the first data is held in the buffer in the first erasure processing.

17. A control method comprising:
receiving a first request signal for requesting to write first data in a first logical address area of a logical volume set in a storage device;
storing the first data in a physical volume set in the storage device in accordance with the first request signal;

erasing after receiving the first request signal, the first data in the first logical address area of the logical volume without erasing the first data in the physical volume; and when executing a first erasure processing for erasing the first data in the physical volume, holding the first data in the physical volume, in a case where history information for indicating that a second erasure processing has been executed prior to the first erasure processing is held, the second erasure processing being for erasing second data same as the first data in the physical volume, and erasing the first data in the physical volume, in a case where the history information is not held, by a processor.

18. The control method according to claim 17, wherein the processor is configured to, after receiving the first request signal, store third data in the first logical address area of the physical volume without erasing the first data stored in the physical volume in accordance with a second request signal for requesting to rewrite the first data of the first logical address area of the physical volume to the third data different from the first data.

19. The control method according to claim 17, wherein the processor is further configured to:

receive, after holding the first data in the physical volume based on the history information, a third request signal for requesting to write fourth data same as the first data in a second logical address area of the logical volume, and generate, in a case where the first data is held in the physical volume, address correspondence information for indicating a correspondence between the first data held in the physical volume and the second logical address area without storing the fourth data in the physical volume in accordance with the third request signal.

20. The control method according to claim 17, wherein the processor is further configured to:

execute the second erasure processing prior to the first erasure processing, the second erasure processing being for erasing the second data in the physical volume, in a case where the second data is stored in the physical volume and is not stored in the logical volume, and generate the history information based on the second data erased in the physical volume.

* * * * *